N. PEDERSEN.
AUTOMATIC PLATE CAMERA.
APPLICATION FILED SEPT. 21, 1918.
1,311,416.
Patented July 29, 1919.
5 SHEETS—SHEET 1.
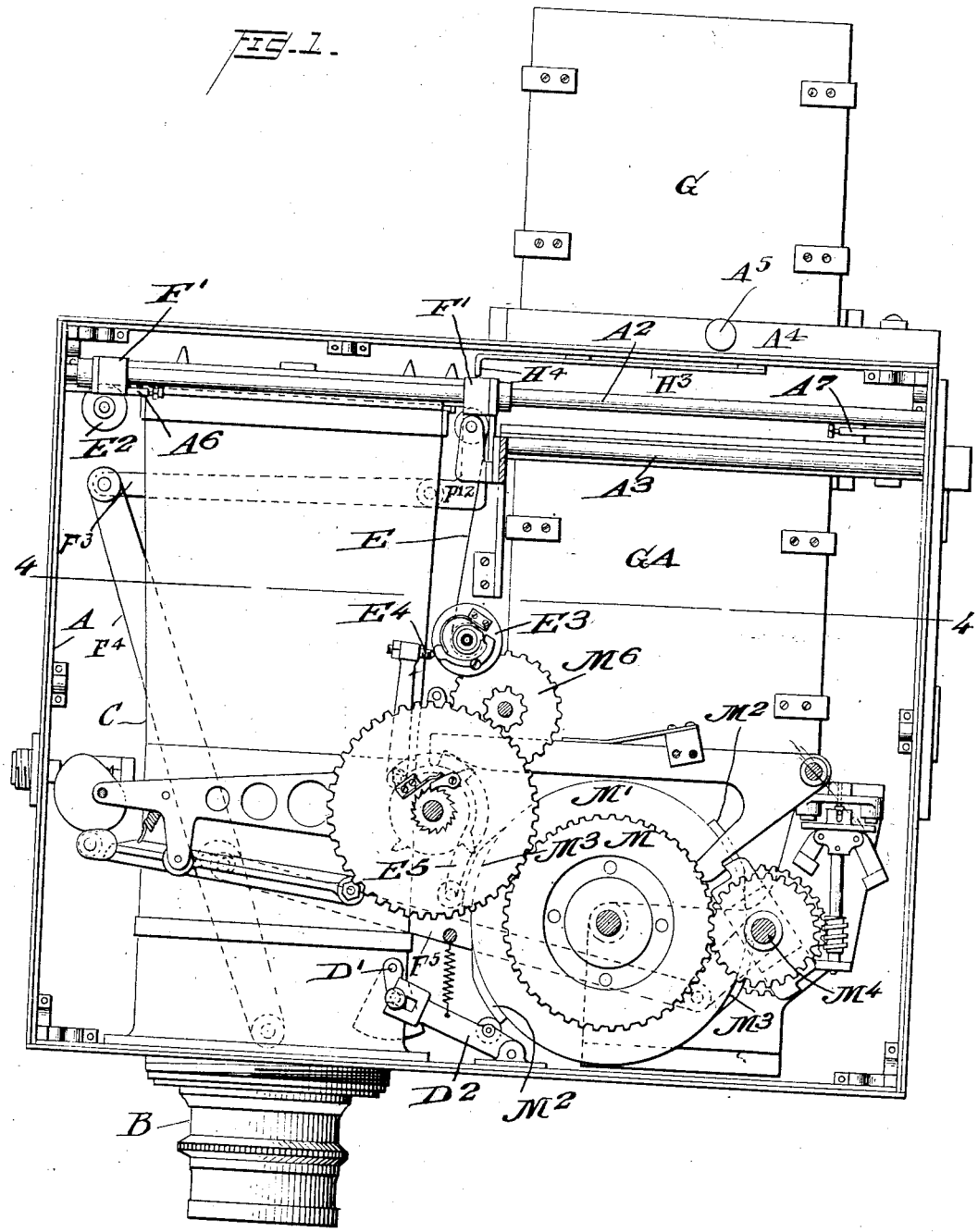

N. PEDERSEN.
AUTOMATIC PLATE CAMERA.
APPLICATION FILED SEPT. 21, 1918.
1,311,416.
Patented July 29, 1919.
5 SHEETS—SHEET 2.
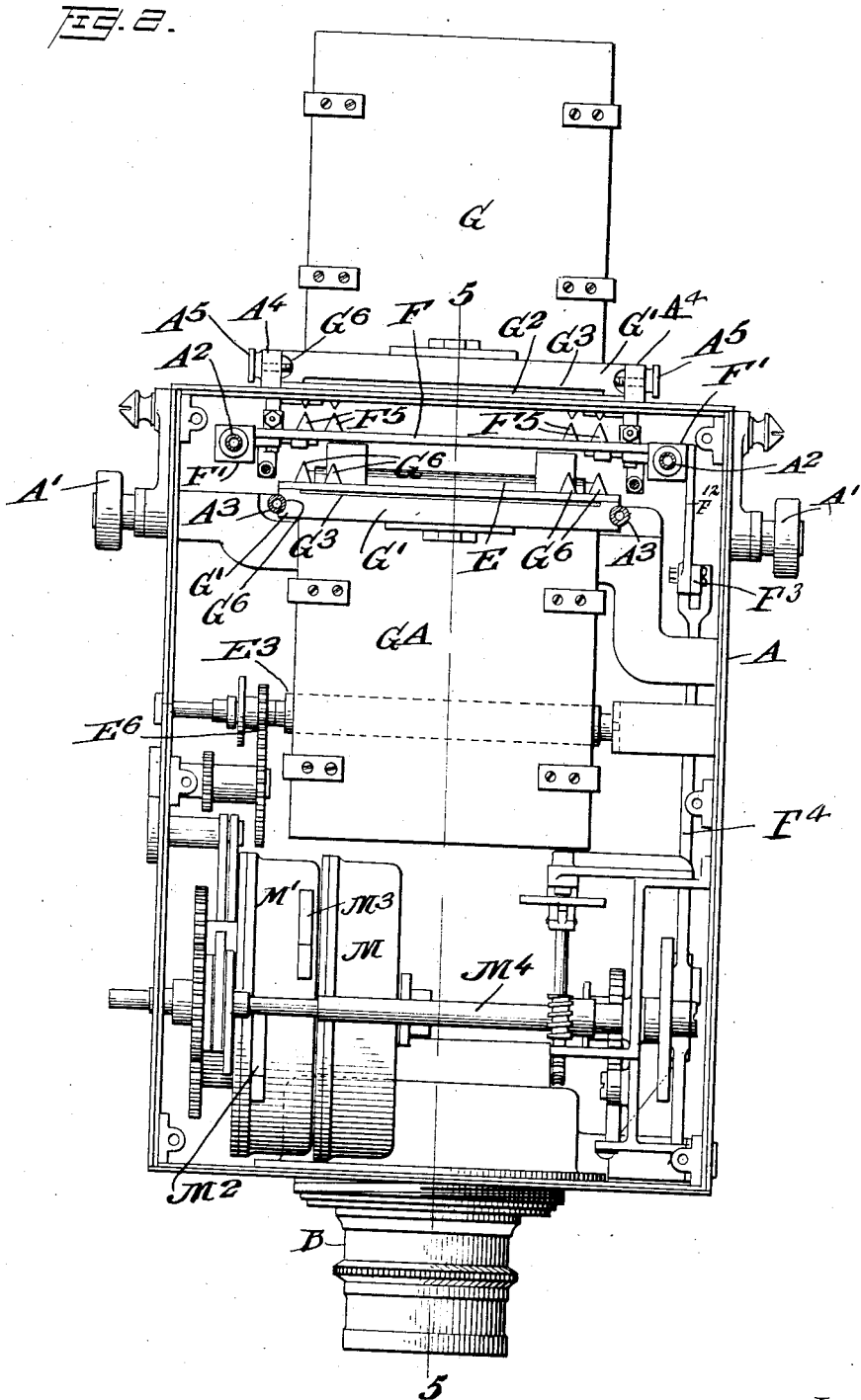

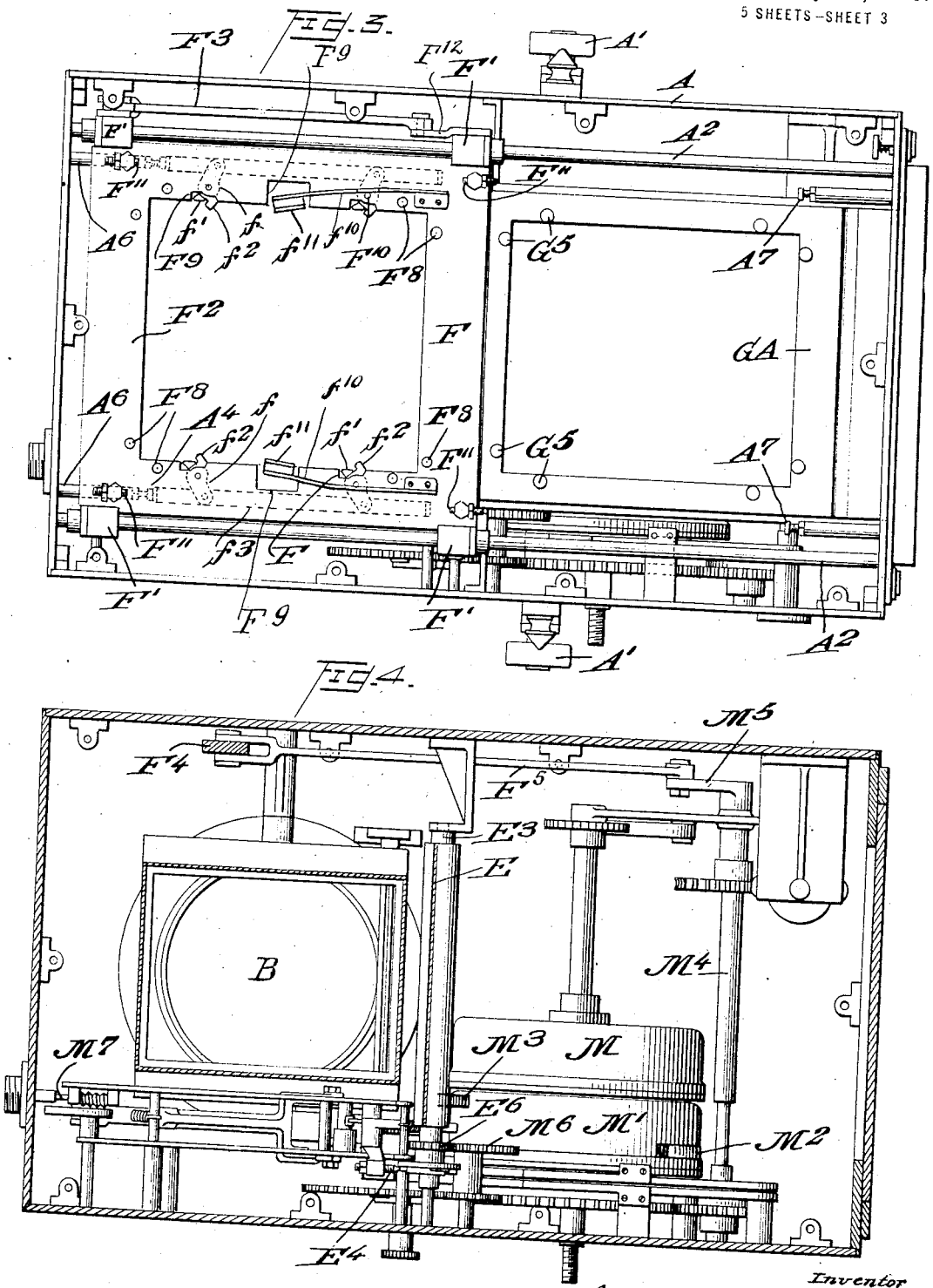

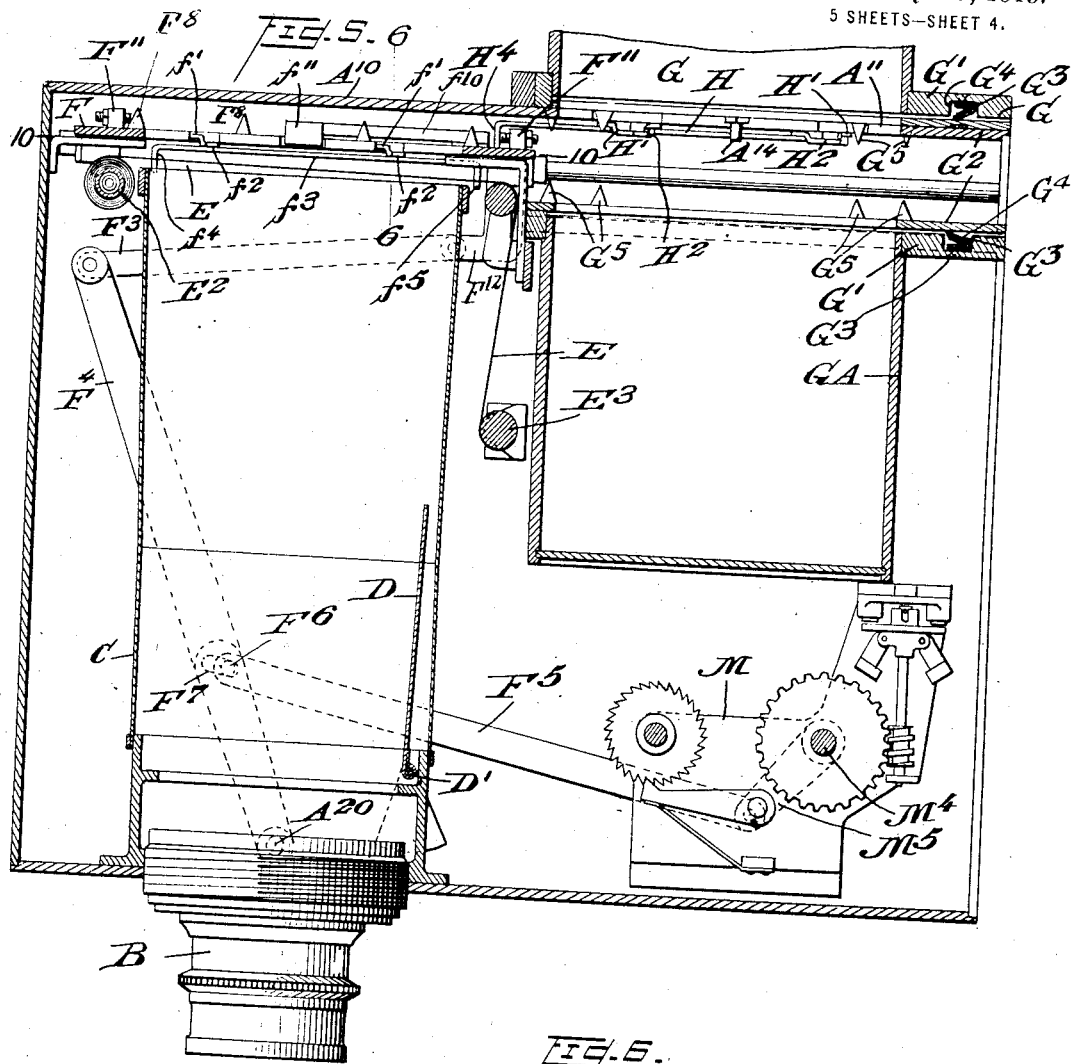
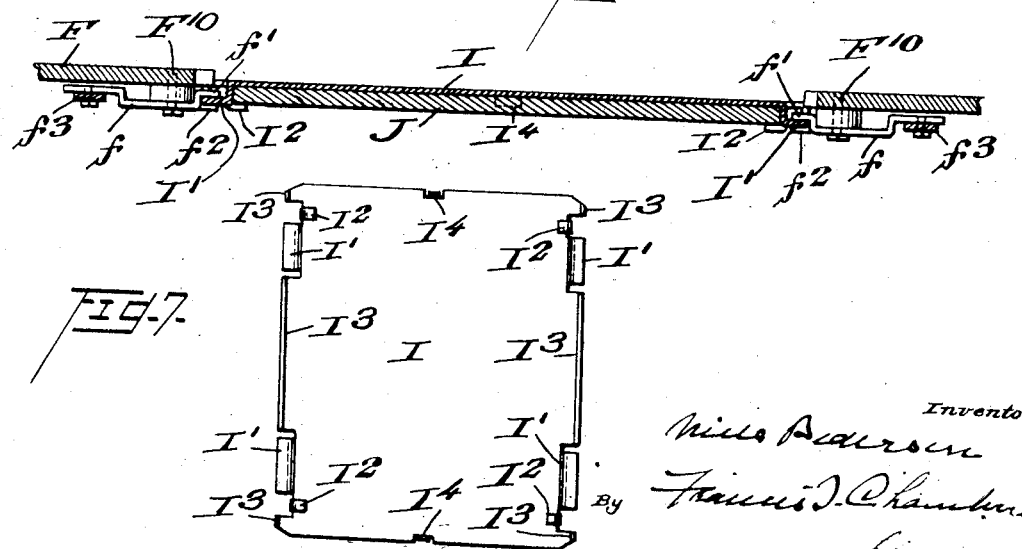

N. PEDERSEN.
AUTOMATIC PLATE CAMERA.
APPLICATION FILED SEPT. 21, 1918.
1,311,416.
Patented July 29, 1919.
5 SHEETS—SHEET 5.
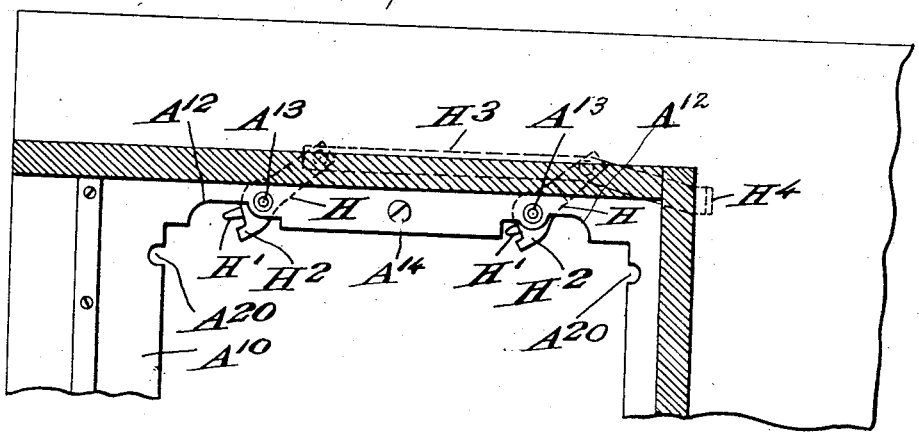
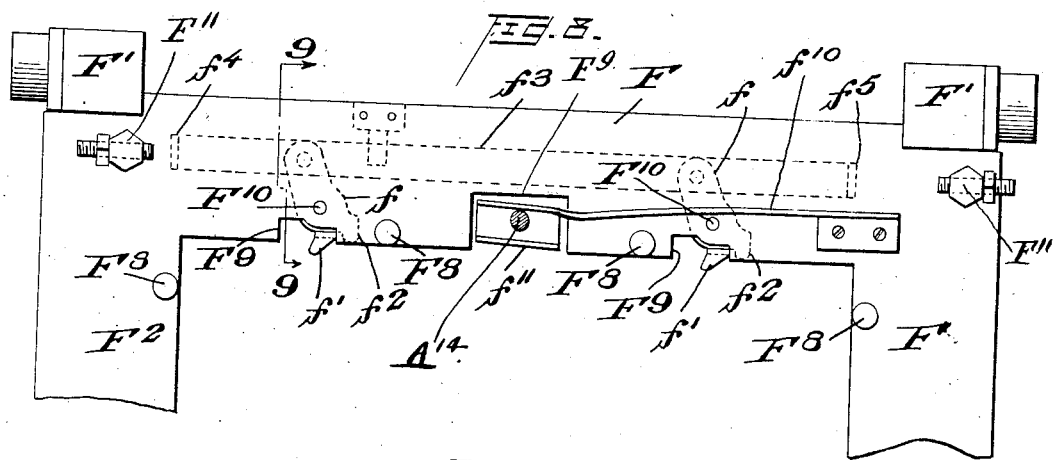
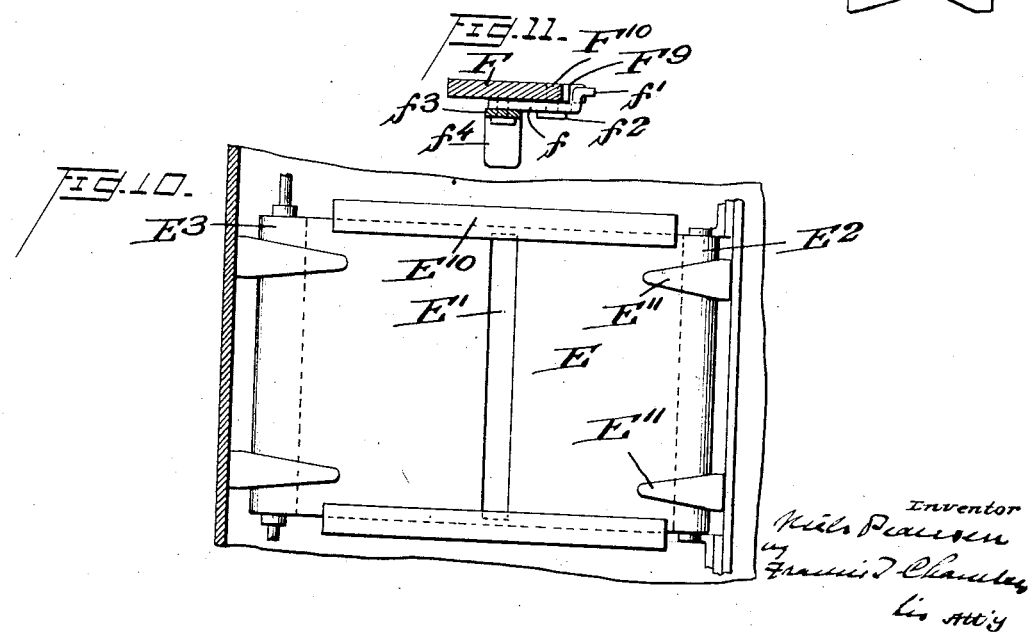

UNITED STATES PATENT OFFICE.

NIELS PEDERSEN, OF PHILADELPHIA, PENNSYLVANIA, ASSIGNOR TO ARTHUR BROCK, JR., OF PHILADELPHIA, PENNSYLVANIA.

AUTOMATIC PLATE-CAMERA.

1,311,416.   Specification of Letters Patent.   Patented July 29, 1919.

Application filed September 21, 1918. Serial No. 255,104.

*To all whom it may concern:*

Be it known that I, NIELS PEDERSEN, a citizen of the United States of America, and a resident of the city and county of Philadelphia, in the State of Pennsylvania, have invented a certain new and useful Improvement in Automatic Plate-Cameras, of which the following is a true and exact description, reference being had to the accompanying drawings, which form a part thereof.

My present invention consists in an improved automatic plate camera adapted to automatically expose a considerable number of plates in rapid succession. My improved camera was especially devised for aeronautical use, and the general object of my invention is to provide an improved camera suitable for such use. Specifically, my invention is mainly concerned with the provision of improved plate feeding mechanism suitable for use in and as a part of a camera of the type specified. The improved plate feeding mechanism which I have devised comprises a magazine for unexposed plates, a separate magazine for exposed plates and mechanism for successively transferring a plate from the first magazine into a position of exposure in front of the camera lens, and then, after the exposure of the plate, transferring it to the magazine for exposed plates.

The various features of novelty which characterize my invention are pointed out with particularity in the claims annexed to and forming a part of this specification. For a better understanding of the invention, however, and the advantages possessed by it and the specific objects, reference should be had to the accompanying drawings and descriptive matter in which I have illustrated and described a preferred embodiment of my invention.

Of the drawings:

Figure 1 is an elevation of a plate camera embodying my invention, shown with a part of the camera case removed.

Fig. 2 is an elevation at right angles to Fig. 1 with another portion of the camera case removed.

Fig. 3 is a plan view of the camera, with the top side of the camera case and the plate magazine mounted thereon removed.

Fig. 4 is a section on the line 4—4 of Fig. 1.

Fig. 5 is a partial elevation in section on the line 5—5 of Fig. 2.

Fig. 6 is a partial section on the line 6—6 of Fig. 5.

Fig. 7 is an inverted plan of one of the plate holders.

Fig. 8 is a partial plan taken similarly to Fig. 3, but on a larger scale and showing parts in different relative positions from those shown in Fig. 3.

Fig. 9 is a partial plan in section on the line 9—9 of Fig. 8.

Fig. 10 is a partial plan in section on the line 10—10 of Fig. 5; and

Fig. 11 is a partial section taken similarly to Fig. 6, but showing the parts in different relative positions.

The camera shown comprises a casing or housing A rectangular in cross section, and intended for suspension as by means of the trunnion A' from an aeroplane or balloon with the optical axis of the lens B, mounted in the bottom of the camera case, vertically disposed. C represents a hollow light shield located in the camera casing and extending from the lens mounting into close proximity with the plate undergoing exposure. D represents a safety shutter pivoted at D' and E represents an exposure controlling shutter. The shutter E (see Figs. 5 and 10) is in the form of an opaque curtain formed with an exposure slit E' and having one end attached to a spring return roll $E^2$, and having its opposite end connected to a roll $E^3$. G represents a plate magazine mounted on the top cover plate of the camera box. From the magazine G the plates pass, one at a time, out of the open lower end of the magazine G through an opening $A^{11}$ in the camera casing top on to a plate feeding carriage or plate carrier F, which is shiftable back and forth between one position in which it lies under the magazine G, and a second position in which it lies above the shield C, and the plate held by it is in the position for exposure. On the return of the carriage F from the plate exposure position to its position beneath the magazine G the exposed plate held by it is discharged into the magazine GA for exposed plates, and another unexposed plate from the magazine G is delivered to the carrier.

The carrier F is reciprocated and the shutters D and E manipulated in the proper timed relation by means of a motor collectively indicated at M. The motor M comprises a rotatable spring drum M' geared to a counter shaft $M^4$ carrying a crank arm $M^5$ connected as hereinafter described to the plate carriage F. As shown the drum $M'$ makes one revolution while the shaft $M^4$ makes two. The drum carries cams $M^2$ and $M^3$. The cams $M^2$ serve to open and close the safety shutter D twice during each rotation of the drum $M'$, and the cams $M^3$ operate twice during each rotation of the drum $M'$ to shift a lever $E^5$, Fig. 1, and thereby through a device $E^4$ to momentarily disconnect the winding roll $E^3$ from a gear $E^6$, Fig. 4, mounted on and detachably connected to the shaft of the roll $E^3$. The gear $E^6$ is in mesh with a gear $M^6$ connected by spur gearing to the drum $M'$. The motor M may be started and stopped and caused to operate at different speeds by means of control mechanism including a shaft $M^7$ which may be operated by means external of the camera casing. In operation the drum $M'$ is given intermittent movements each of a quarter of a revolution and of a frequency regulated by the adjustment of the shaft $M^7$.

I have not thought it necessary to illustrate or describe the construction and operation of the motor M and its controlling mechanism in detail, as the specific constructions and operation of this motor forms no part of my present invention and a camera operating motor of this general type is fully disclosed in the copending application Serial No. 118,957, filed Sept. 8, 1916, jointly by Lodewyk J. R. Holst and myself. The automatic film camera shown by said application has safety and exposure controlling shutters generally like the shutters D and E disclosed herein in construction and operation. While the motor and controlling mechanism disclosed is very well adapted for operating the camera disclosed and claimed herein, my present invention permits the use of any suitable motor mechanism adapted to give the shutters and plate transfer mechanism their proper and properly timed movements.

The magazine G is in the form of a box open at its bottom, and having a flange like member $G'$ running around its open end. Secured to the under side of the flange $G'$ is a correspondingly shaped plate $G^2$ which is spaced away from the flange $G'$ proper to form a slot for a sliding shutter which may be inserted to close the otherwise open end of the magazine, when the latter is removed from the camera. A flexible light shield $G^4$, mounted in a slot $G^3$ in the flange $G'$ closes the slot between $G'$ and $G^2$ when the shutter is removed. The opposite side edges of the flange $G'$ are grooved as indicated at $G^6$ (see Fig. 2) and these grooves receive clamping screws $A^5$ passing through ribs $A^4$ formed on the cover of the camera casing when the magazine G is secured in place thereon. Conical pins $G^5$ are carried by the plate $G^2$ to guide the passage of the plates into and out of the magazine. The exposed plate magazine GA is identical in construction with the magazine G, and is interchangeable with the latter. The magazine GA when in place in the camera casing is supported on parallel rods $A^3$ (see Fig. 2) through the grooves $G^6$ formed in the side edges of the flange $G'$.

While my improved plate handling mechanism may be used with any rigid plate, the particular mechanism shown was especially devised for use with glass plates J, Fig. 6, each detachably mounted in a corresponding holder I. The plates are mounted in their holders before being inserted in the unexposed plate magazine G, and are not removed from their holders until after the plates are taken out of the exposed plate magazine GA. As shown in Figs. 6 and 7, each plate holder I is rectangular and is formed of sheet metal. The major portion of the opposite side edges of the holder I are provided with transverse stiffening flanges $I^3$. Portions of each side edge are turned back to form clips $I^2$ which take over the edge of the plate J. Other portions $I'$ of the side edges, one adjacent each end of the plate, are offset for engagement by the plate manipulating fingers $H'$ and $H^2$ and $f'$ and $f^2$ as hereinafter explained. Small projections $I^4$ are formed at the opposite ends of the plate holders I to prevent accidental displacement of the plate and plate holder. It is to be understood that the flexible plate holder is sprung sufficiently to carry the lugs $I^4$ out of the way of the plate when the latter is being inserted in or removed from the holder I.

The stack of unexposed plates in the magazine G is supported by means of levers H pivoted at $A^{13}$ to the under side of the top cover plate $A^{10}$ at the side edges of the opening $A^{11}$. Each lever H is formed with two fingers $H'$ and $H^2$ located at upper and lower levels respectively. By shifting each lever H into one or the other of its two operative positions, one or the other of the fingers $H'$ and $H^2$ of the lever is moved into a position and the other is moved out of a position in which it extends under the bottom plate in the stack of plates held in the magazine G. The cover $A^{10}$ is notched as indicated at $A^{12}$ to provide clearance for the upper fingers $H'$. The notches $A^{12}$ are enlarged so that, in conjunction with the other notches $A^{20}$ formed in the member $A^{10}$, clearance is provided for the conical guide pins $G^5$ carried by the magazine G. The two levers H, at each side of the opening in cover $A^{10}$ are connected by a link $H^3$, which is provided with a downturned end $H^4$. The downturned ends $H^4$ of the two links $H^3$ are engaged by adjustable stops $F^{11}$ carried at the left hand end of the transfer carriage $F'$, as seen in Fig. 5, and are thereby caused to shift the levers H into the position in which the fingers H' project across the path of vertical movement of a plate holder I in its movement out of the magazine G as the transfer carriage F is moved under the magazine G. When the carriage F is moved to its position above the light shield C, an opposite pair of stops $F^{11}$ at the right hand end of the carriage F engage the ends $H^4$ of the links $H^3$, and shift the levers H into the position in which the fingers $H^2$ project across the path through which a plate holder I must move vertically downward out of the magazine G. The bottom plate of the stack, supported by the fingers H' in the one position of the levers H, drops on to the fingers $H^2$ when the fingers H' are thus retracted. The subsequent shifting movement of the levers H, on the return movement of the carrier F, moves the fingers H' above the portions I' of the plate then supported by the fingers $H^2$ and beneath the portions I' of the next plate above in the stack. As the fingers H' are thus returned to their stack supporting position, the fingers $H^2$ are moved clear of the plate previously supported thereby, which then drops on to the fingers f' of levers f pivoted on the plate carriage F at the margin of the plate receiving aperture $F^2$ in the latter.

The plate carriage F is formed with ears F' at each corner which are slidingly mounted on guide rods $A^2$ secured at their ends to opposite walls of the camera casing. There are two levers f located at each of the two opposite sides of the aperture $F^2$ in the plate carriage F. Each lever f is similar in construction and operation to the levers H, each lever f comprising fingers f' and $f^2$ similar to the fingers H' and $H^2$ of the levers H. The two levers f at the same side of the carriage F are connected by a link $f^3$ having its opposite ends $f^4$ and $f^5$ downturned. When the plate carrier F is moved into its position beneath the magazine G, the ends $f^5$ of the links $f^3$ engage adjustable stops $A^7$ carried by the camera casing, thus shifting the levers f into the position in which the fingers f' are in position to receive and support the portions I' of the plate holder simultaneously released by the fingers $H^2$ of the levers H. When the carriage F is moved into the plate exposure position, the ends $f^4$ of the links $f^3$ engage adjustable stops $A^6$ secured to the corresponding side of the camera casing. This shifts the levers f into the positions in which the fingers f' no longer support the plate holder portions I', and in which the fingers $f^2$ are in position to receive the plate holder released by the fingers f'. The prompt downward movement of the plates previously supported by the fingers H' and the fingers $H^2$, when the levers H are shifted to permit such movement, is insured not only by the weight of the plate immediately supported but also by the weight of the plates in the stack above it. The downward movement of a plate holder supported by the fingers f', when these fingers are actuated to release the plate holder, is insured by means of bent springs $f^{10}$ secured to the carrier F at opposite sides of the opening $F^2$ in the carrier F. The springs $f^{10}$ are provided at their free ends with bent portions shaped to provide an inclined cam surface $f^{11}$. The inclined surfaces $f^{11}$ of the two springs $f^{10}$ bear against the upper corners of the side edges of the plate holder I supported on the carrier when the latter is in the plate exposure position and cam the plate holder downward when the levers f are manipulated to permit such movement. The free ends of the springs $f^{10}$ work in and out of notches $F^9$ formed for the purpose in the carrier. To spread the free ends of the two springs apart when the plate carrier is moved underneath the magazine G so that they will not then engage the plate holders, cams in the form of studs $A^{14}$ (Fig. 5) are secured to the top $A^{10}$ of the camera casing.

The plate carrier F is shifted back and forth by operating connections between the carrier and the motor crank arm $M^5$ comprising a link $F^3$ connected at one end to the carrier F through an arm $F^{12}$, and at the other end the upper end of the lever $F^4$ pivotally connected to the camera casing at $A^{20}$. The lever $F^5$, pivoted at one end to a crank pin carried by the crank arm $M^5$, carries at its opposite end a pin $F^6$ working in a short slot $F^7$. The pin and slot connection between the levers $F^4$ and link $F^5$ is provided to avoid the necessity for interrupting each intermittent movement of the motor M at the exact instant at which the plate carrier reaches the limits of its movement, and where it should remain stationary for an interval.

The operation of the camera mechanism disclosed will be clearly understood from the foregoing description. It will be apparent to those skilled in the art that the plate transfer mechanism disclosed is effective and reliable. The camera mechanism shown possesses special advantages for the aeronautical usage for which it was devised. The camera mechanism, and most of the operating parts, can be made entirely, or for the most part, out of aluminum to economize weight, and the simplicity of construction insures reliable operation under severe operating conditions. The location of the two magazines in vertical alinement and the manner in which the two plate stacks contained therein are varied in height prevent any lateral displacement of the center of gravity of the camera from occurring as the number of plates and plate holders in the magazine G is decreased and the number of plates and plate holders in the magazine GA correspondingly increased. This is of the utmost practical importance since the results obtained with the camera depend for their value upon the maintenance of the optical axis of the camera in a vertical position. For this reason the camera must be suspended so that it will not share in any movements of the supporting aeroplane or balloon, from what may be described as a position of even keel. Any horizontal displacement of the center of gravity of the suspended camera with reference to the vertical plane through the axis of the trunnions A' would of itself disturb the vertical parallelism of the optical axis of the camera.

While in accordance with the provisions of the statutes I have illustrated and described the best form of my invention now known to me, it will be apparent to those skilled in the art that changes may be made in the form of the apparatus disclosed without departing from the spirit of the invention as set forth in the appended claims, and that certain features of the invention may sometimes be used to advantage without a coresponding use of other features.

Having now described my invention, what I claim as new and desire to secure by Letters Patent, is:

1. A camera having in combination reservoirs for unused and used plates placed in vertical alinement one above the other and to one side of the lens, a plate carrier reciprocatingly movable from a position in alinement with the lens to a position between the reservoirs, means for delivering unused plates to the carrier from the reservoir containing them and means for delivering used plates from the carrier to the other reservoir.

2. A camera having in combination reservoirs for unused and used plates placed in vertical alinement one above the other and to one side of the lens, two sets of plate supporting fingers arranged between the upper and lower reservoirs at different heights and alternately movable to operative position, a plate carrier reciprocatingly movable from a position in alinement with the lens to a position between the reservoirs and below the plate holding fingers aforesaid, retractable fingers for holding a plate in the carrier and means for retracting said fingers operating when the carrier is in registry with the lower reservoir.

3. A camera having in combination reservoirs for unused and used plates placed in vertical alinement one above the other and to one side of the lens, two sets of plate supporting fingers arranged between the upper and lower reservoirs at different heights and alternately movable to operative position, a plate carrier reciprocatingly movable from a position in alinement with the lens to a position between the reservoirs and below the plate holding fingers aforesaid, two sets of plate holding fingers secured at different levels to the carriage and alternately movable to operative position, and means operating synchronously with the movements of the carrier for actuating the fingers as specified.

4. In a camera the combination with a casing having an opening for the insertion of plates arranged at one side of the lens, of a plate carriage movable between said opening and a position in registry with the lens, retractable plate holding fingers arranged in two sets at different levels and alternately operative for supporting and delivering to the carriage plates fed through the opening, two sets of plate holding fingers secured to the carriage so as to be alternately operative and to hold a plate at different levels, and means operating synchronously with the movement of the carriage for actuating the fingers as specified.

5. In a camera a reciprocating plate carriage having in combination two sets of plate supporting fingers arranged at different levels and arranged to move alternately to operative positions, spring pressure plates acting to press a supported plate down on the fingers and deflecting devices arranged in the path of the carriage for pressing the spring pressure plates out of operative position.

NIELS PEDERSEN.